United States Patent Office 2,813,350
Patented Nov. 19, 1957

2,813,350

PROCESS FOR CONCENTRATION OF SOLUTIONS BY SUBLIMATION

Carl Berger, Dayton, Ohio, assignor to The Commonwealth Engineering Company of Ohio, Dayton, Ohio, a corporation of Ohio Application March 12, 1954, Serial No. 415,871

2 Claims. (Cl. 34—5)

This invention relates to a method and apparatus for effecting the concentration of solutions.

Laboratory methods which rely upon sublimation techniques for effecting solute concentration are slow and laborious and the apparatus utilized therefor is without effective means for cycling of solution during concentration. It is accordingly a primary object of this invention to provide a method for concentrating solutions which method is rapid, not deleterious to the product, not limited by eutectic factors, and is useful for commercial production purposes.

It is yet another object of the invention to provide a novel apparatus arrangement for effecting concentration of solutions by a combination of sublimation and evaporation methods.

These and other allied objects of the invention are achieved, generally speaking, by spraying the solution which is to be concentrated into a fine mist form, freezing the mist to produce small solid particles of large surface area, and removing from the vicinity of the surface of the particles the vapors of solvent.

In the preferred practice of the invention the solution is initially cooled to a temperature slightly above the freezing point thereof, sprayed into an evacuated zone and frozen into a continuously moving stream, the solvent vapors being collected as the stream passes on to a collection point for the particles. Vacuum conditions in this preferred method are maintained while withdrawing the solvent vapors and this contributes to further evaporation of the solvent.

The collected solid material will be readily melted and it may be recycled for further concentration in the same way. The solvent is itself easily collectible for further use which is a particularly important feature in connection with the more expensive solvents, such as alcohol, ketones, etc.

The apparatus of invention most suitably is so constructed and arranged that the stream of fine sprayed material freezes quickly and the temperature of the freezing zone is maintained sufficiently low so that the heat of fusion of the particles is readily removed. Most simply the particles are frozen as they pass through a vertical tubular chamber having cooling coils in the walls thereof.

The fineness of the particles which occasions a very slow settling thereof through a vertically arranged tube and the provision of vacuum conditions within the equipment plus the relatively large surface area of the particles contributes to the rapid formation of a vapor phase of the solvent and hence contributes also to the concentration of the solids in the particles.

The particles, freed of at least a portion of the solvent in one pass through the apparatus, are collectible in a fluffy mass form and easily remelted for recycling and a second pass through the apparatus to effect substantially any concentration desired.

The invention will be more fully understod by reference to the following detailed description and the drawings wherein.

Figure 1:
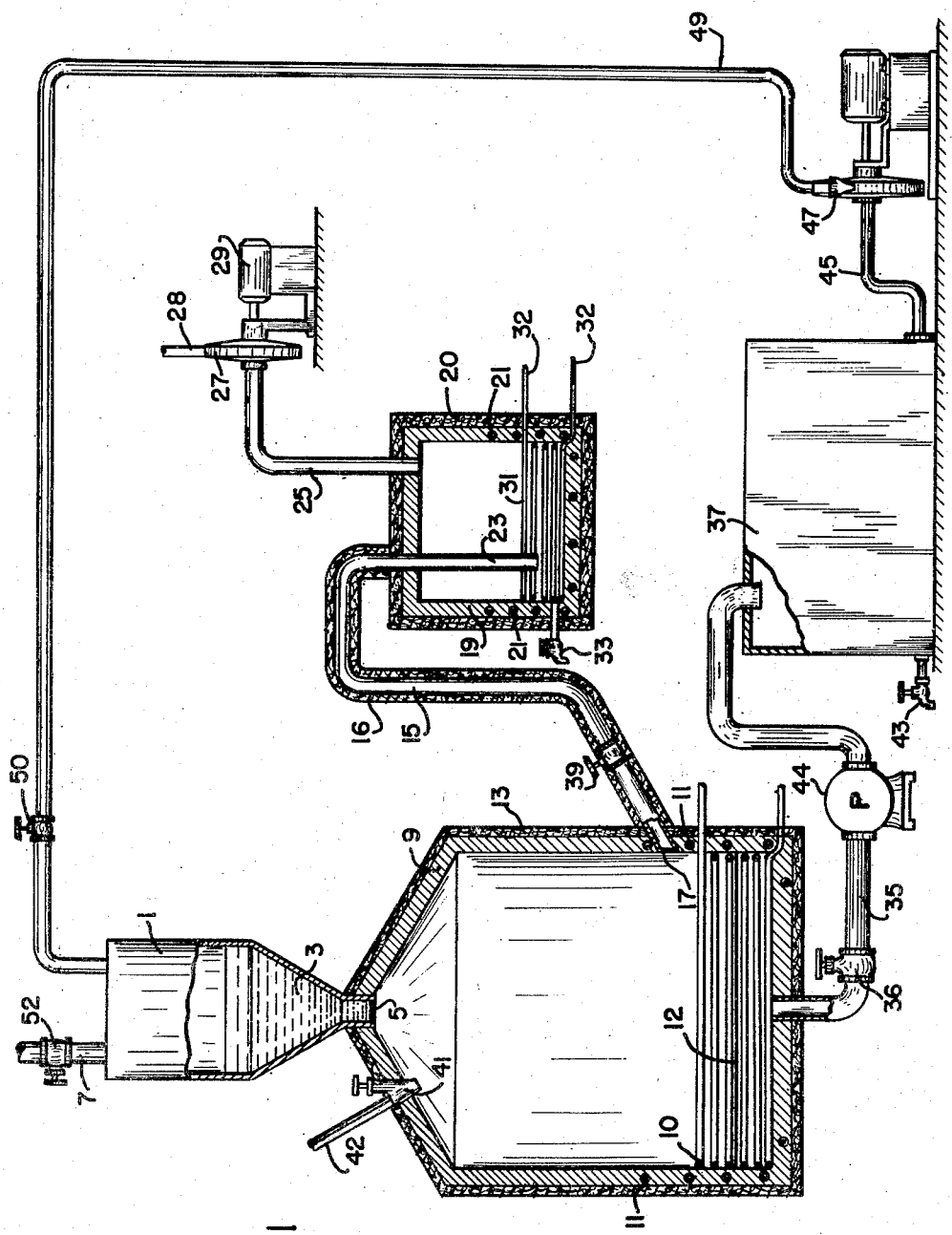
Figure 1 illustrates apparatus useful in one embodiment of the invention.
Figure 2:
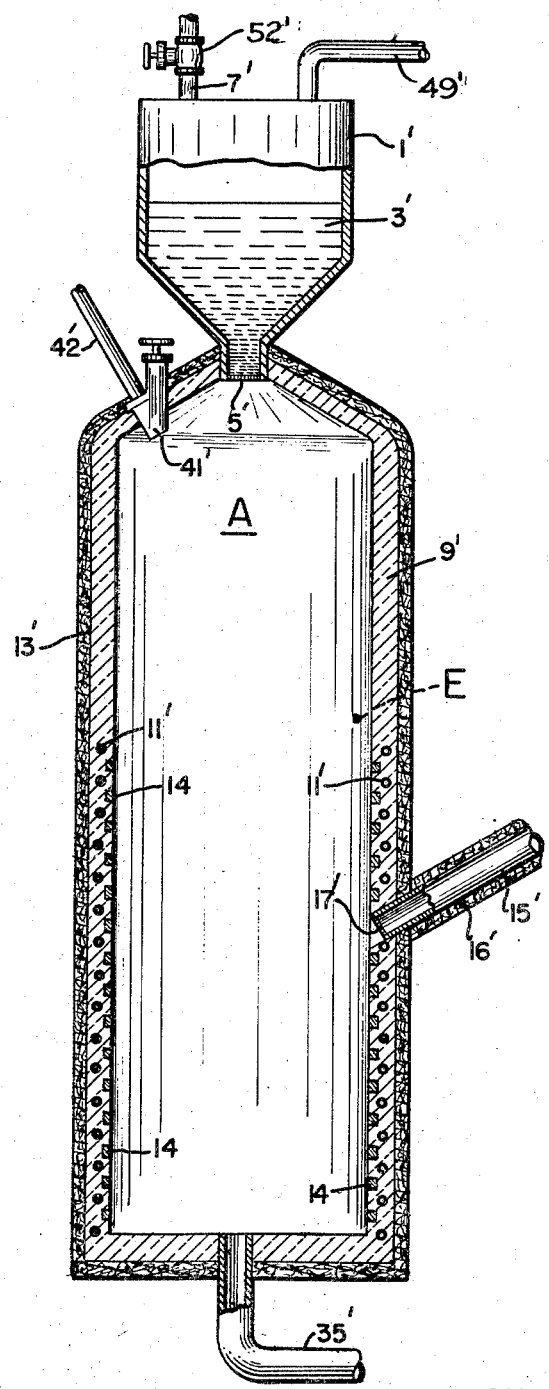
Figure 2 illustrates apparatus useful in a preferred embodiment of the invention.

Referring to the drawings there is shown at 1 a closed tank containing a solution 3, for example, a 10 percent sucrose solution, which is to be concentrated. The lower end of the tank is supplied with a nozzle 5 having very fine apertures through which the liquid may be passed to achieve a fine mist form. A conduit 7 connected to the upper end of the tank is adapted to pass a gas under pressure, preferably an inert gas such as nitrogen, to the surface of the liquid 3 to develop sufficient pressure for the formation of the spray and the fine mist. With some liquids and tanks the head developed by the liquid itself will be sufficient to effect the mist formation.

Cylinder 9 is sealed to tank 1 in an air-tight relationship therewith and the relatively thick wall of this cylinder contains cooling coils 11, adapted to pass any suitable coolant such as ammonia or Freon. The outer wall of the cylnider is insulated at 13 to permit close temperature control within the chamber of the cylinder and for reasons of economy.

The cylinder wall is also provided with a conduit 15 which at the juncture of the wall and conduit is provided with a very fine mesh screen or filter paper 17 capable of permitting the passage of gases but adapted to retain solid particles striking thereagainst. All-glass filter papers such as those useful in filtering smoke from air serve this purpose.

The remote end of conduit 15 is connected into a trap 19 also in the form of a cylinder having insulation material 20 thereabout and further having cooling coils 21 in the wall thereof. The depending portion 23 of conduit 15 is adapted to conduct vapors passing through the conduit to the cooling zone which is maintained at a very low temperature—in the case of the sucrose solution under consideration about —80° C. to effect rapid condensation of the water vapors and the maintaining of controlled vacuum conditions in the system. Conduit 15 is itself insulated at 16 to prevent premature condensation.

A pipe 25 leads from the upper end of trap 19 to vacuum pump 27 provided with exhaust port 28; pump 27 is adapted to be driven by motor 29 to provide low vacuum conditions in the trap and the chamber of the cylinder 9.

At its lower end the trap 19 is provided with steam heating coils 31 energizable when desirable through conduits 32 to melt solvent in the trap and a tap 33 is provided to permit withdrawal of liquid solvent.

Referring again to cylinder 9 the lower end thereof is provided with a steam heating coil 10 and matter collected at 12 intimately contacts the coil and is melted intermittently upon application of steam to the coil and concentrated material flows through pipe 35 to tank 37 when valve 36 is opened and pump 44 is operated. The cooling coils are preferably inoperative when the heat is applied to the mass.

To occasion the flow of the liquid, particularly under viscous conditions thereof, it is necessary to break the vacuum in cylinder 9 and this is accomplished by closing the valve 39 of conduit 15 and opening the valve 41 in the cylinder 9 to admit air or more suitably an inert gas through line 42 to the cylinder itself. Upon closing of valve 41 and reopening valve 39 any gas remaining in the chamber will be drawn through the trap 19, pump 27 to exhaust 28 by operation of the motor 29.

The liquid in tank 37 when sufficiently concentrated is driven off through tap 43; the liquid if desired may be drawn through line 45 by pump 47 and recycled to tank 1 through pipe 49, which latter is provided with valve 50 to prevent the passage of gas backwardly through the line when the same is not in operation. Conduit 7 is provided with a valve 52 which shuts off the flow of inert gas to the tank 1 when the pump 47 is operating to recycle liquid to the tank.

The sugar solution thus referred to, in the operation of the apparatus, is sprayed into the chamber of cylinder 9 and forms a fine mist, the particles of which are frozen to solid form as they descend slowly through the chamber of the cylinder 9. The sucrose solution mist will, when the chamber 9 is maintained at a temperature of about minus 3 to about minus 5 degrees C. be frozen to solid particle form before the particles are midway of the vertical length of the cylinder.

Due to the large surface area of the very small particles and due also to the vacuum conditions within the chamber water vapor forms rapidly even at the low temperature and is drawn through the conduit 15 to the trap 19. The descent of the particles is slow and due to their size and the rate of descent may be controlled by limiting the vapor pressure within the chamber. For the sucrose solution under consideration a pressure of about 2 inches of water within the chamber will produce satisfactory conditions for concentration by sublimation.

The particles themselves for the most part pass directly down the chamber although a few may, under the influence of the vacuum condition, strike the filter and/or sidewalls; accordingly most of the flowing mass is directly collectible in the lower portion of the chamber and when the same is melted the filter and the wall itself will be freed of solid particles by melting of the particles.

Concentration of the solution to 50 percent by weight of sugar may be effected in three or four passes of the apparatus and the mass is then drawn off through tap 33.

In Figure 2 numerals similar to Figure 1 but primed have been employed to indicate like parts and the cylinder 9′ connects the other associated vacuum and circulation apparatus just as does the cylinder 9 of Figure 1.

Cylinder 9′ as illustrated is relatively long and narrow, suitable dimensions being 35 ft. long by 4 ft. in diameter. Such cylinders are particularly useful where the particles normally tend to settle fairly rapidly.

In the apparatus of Figure 2 the cooling coils 11′ extend upwardly to about one-half or a little more of the length of the cylinder and the aim is to have the particles freeze just as they pass the point indicated at E. Upwardly of point E in zone A a slightly normal condition prevails and the particles of the mist lose solvent by evaporation. Heat of fusion evolved at E as the particles freeze tends to rise and maintain zone A in such condition that the evaporation of solvent from the particles will be substantial—such evolved solvent is then drawn off through the vacuum line as is sublimed solvent as described in connection with Figure 1.

The apparatus of Figure 2 thus comprises a combination of sublimation and evaporation processes which improve the efficiency of the operation particularly under those conditions where the particles tend to settle rapidly.

In Figure 2 the heating coils 14 are electrical and imbedded in the wall of the cylinder 9 and are operated alternatively with the cooling coils 11′. In connection with the cooling coils of Figure 2 they, like the cooling coils of Figure 1, may employ any suitable coolant medium.

It is further to be noted that the trap such as that shown in Figure 1 may itself contain any suitable medium which would permit of absorption of the solvent withdrawn from the solution, if such absorption is desired, for example, sulfuric acid or phosphorous pentaoxide may be employed.

It will be understood that this invention is susceptible to modification in order to adopt it to different usages and conditions and accordingly, it is desired to comprehend such modifications within this invention as may fall within the scope of the appended claims.

I claim:

1. A process for concentrating solutions comprising the steps of initially cooling the solution to be concentrated to a temperature near the freezing point of the solution, evacuating a closed zone, spraying said solution into said zone in the form of a freely falling mist, freezing the mist particles as the same move downwardly through the evacuated zone to bring about sublimation and evaporation of the solvent therefrom, maintaining the evacuated condition while withdrawing solvent vapors thus produced, collecting the residual particles and melting the same to a liquid back through the said evacuated closed zone, and thereafter recycling said liquid and recovering a concentrate.

2. A process for concentrating solutions comprising the steps of initially cooling the solution to be concentrated to a temperature near the freezing point of the solution, evacuating a closed zone, spraying said solution into said zone in the form of a freely falling mist, freezing the mist particles as the same are retained in the evacuated zone to bring about sublimation and evaporation of the solvent therefrom, withdrawing said solvent vapors and condensing the same to recover the solvent, collecting the residual particles, heating the same to form a fluid mass, and recycling said mass back through the said evacuated closed zone and recovering a concentrate.

References Cited in the file of this patent

UNITED STATES PATENTS

| | | |
|---|---|---|
| 996,832 | Campbell | July 4, 1911 |
| 2,100,151 | Tietz | Nov. 23, 1937 |
| 2,301,595 | Washburn | Nov. 10, 1942 |
| 2,400,748 | Flosdorf | May 21, 1946 |
| 2,471,035 | Hurd | May 24, 1949 |
| 2,616,604 | Folsom | Nov. 4, 1952 |